Dec. 12, 1967 D. E. ARMSTRONG ET AL 3,357,505
HIGH TEMPERATURE ROCK DRILL
Filed June 30, 1965 3 Sheets-Sheet 1

INVENTOR.
D. E. Armstrong, J. S. Coleman, B. B. McInteer
R. M. Potter, E. S. Robinson
BY Dec. 12, 1967 D. E. ARMSTRONG ET AL 3,357,505
HIGH TEMPERATURE ROCK DRILL
Filed June 30, 1965 3 Sheets-Sheet 2

INVENTOR.
D. E. Armstrong, J. S. Coleman, B. B. McInteer
R. M. Potter, E. S. Robinson
BY Dec. 12, 1967  D. E. ARMSTRONG ET AL  3,357,505
HIGH TEMPERATURE ROCK DRILL Filed June 30, 1965   3 Sheets-Sheet 3

INVENTOR.
D. E. Armstrong, J. S. Coleman, B. B. McInteer
R. M. Potter, E. S. Robinson
BY

United States Patent Office 3,357,505
Patented Dec. 12, 1967

3,357,505
HIGH TEMPERATURE ROCK DRILL
Dale E. Armstrong, Santa Fe, and James S. Coleman, Berthus B. McInteer, Robert M. Potter, and Eugene S. Robinson, Los Alamos, N. Mex., assignors to the United States of America as represented by the United States Atomic Energy Commission
Filed June 30, 1965, Ser. No. 468,654
1 Claim. (Cl. 175—16)

ABSTRACT OF THE DISCLOSURE

A high temperature rock drill having a tungsten shoe and flat coiled heating element, said shoe having an annular tube concentrically located therein is described.

---

This invention describes an apparatus for drilling holes in the earth. Conventional drilling apparatus involves breaking and grinding solid rock; in contrast, the apparatus of this invention involves turning the rock into a liquid and thus the problems can be handled within the framework of hydrodynamics. In the early experiments the inventors discovered that tungsten foil when heated to incandescence electrically melted its way through samples of igneous rock. Molten rock protected the hot metal tungsten surface from attack by the water vapor which boiled from the rock. These experiments indicated that the common refractory metals are suitable for construction of drills for penetrating rock. The inventors have found that the energy needed for melting rock is similar to the amount required to break and pulverize it, that is, of the order of about 1 kcal./cm.$^3$. With rocks of low porosity, an essential design problem is the development of techniques for removal of the molten lava from this area adjacent to the drill surface.

By way of introduction to this invention, it is useful to summarize the general features needed for a thermal drill for rock. The melting points of most common siliceous minerals fall in the range of 1100–1500° C. with the highest lava temperature that has been reported being about 1300° C. A drill capable of melting through minerals such as these must retain its strength at somewhat higher temperatures, preferably to about 1700° C. Although this is well above the melting point of steel, it is well within the range of practical use of refractory metals molybdenum, tungsten, rhenium, and iridium.

The heats required for melting a variety of siliceous minerals have been measured at approximately 1000 cal./cm.$^3$ including both the heat of fusion and the heat required to bring mineral from room temperature to the melting point. The amount of power which must be supplied each square centimeter of the drill face is listed in Table I which follows.

TABLE I

| Speed | | Power Flux | |
|---|---|---|---|
| cm./sec. | Ft./day | Cal./cm.$^2$ sec. | Watts/cm.$^2$ |
| 0.001 | 2.7 | 1 | 4.2 |
| 0.01 | 27 | 10 | 42 |
| 0.1 | 270 | 100 | 420 |
| 1.0 | 2,700 | 1,000 | 4,200 |

Since the thermal diffusivity of rock is low (approximately 0.01 cm.$^2$/sec.) most of the heat spreading in front of the drill face will be overtaken for drilling rates of practical interest. On the other hand, the heat spreading from the hot sides of the drill is essentially lost. Therefore, most efficient utilization of the available energy will be obtained with drills having higher ratios of frontal to side areas. To achieve high drilling rates, a large temperature gradient on a very small thermal impedance is necessary between the power source and the working face of the drill. For example, for the delivery of 100 cal./cm.$^2$ sec. from a power source at 1800° C. to the drill face at 1300° C., the thermal impedance will correspond to about 1.5 cm. of molybdenum or 0.005 cm. of helium gas. Rocks melt at temperatures where the resulting lava is typically highly viscous with properties like glass at glass-blowing temperatures. The reported viscosities of minerals seldom decrease below 10 poise even well above the melting temperatures so that the lava is never watery (10$^{-2}$ poise). The high viscosity of the lava serves to contain gases which would otherwise be released in the melting process and is related to their remarkable adhesion to hot metal surfaces. After the molten rock cools a glass-like obsidian remains. These are the properties which the inventors have utilized in their invention in handling the melt and removing it from the hole.

Since the drill face must be able to withstand high temperatures of the order of 1800° C., the refractory metals were first investigated as to their ability to withstand corrosion by molten rock. The inventors found that indeed the refractory metals when used as either the heating element or as the drill shoe were resistant to attack by molten rock. These experiments demonstrated that a variety of basaltic rocks could be pierced by hot tungsten or molybdenum drills, that the lava could be induced to flow into small tubes near the drill face, and that it could be extruded as either a rod or in small particles.

It is therefore an object of this invention to provide a device for drilling through varieties of rock.

Other objects of this invention will be apparent from the following description when read in connection with the accompanying drawings in which.

Figure 1:
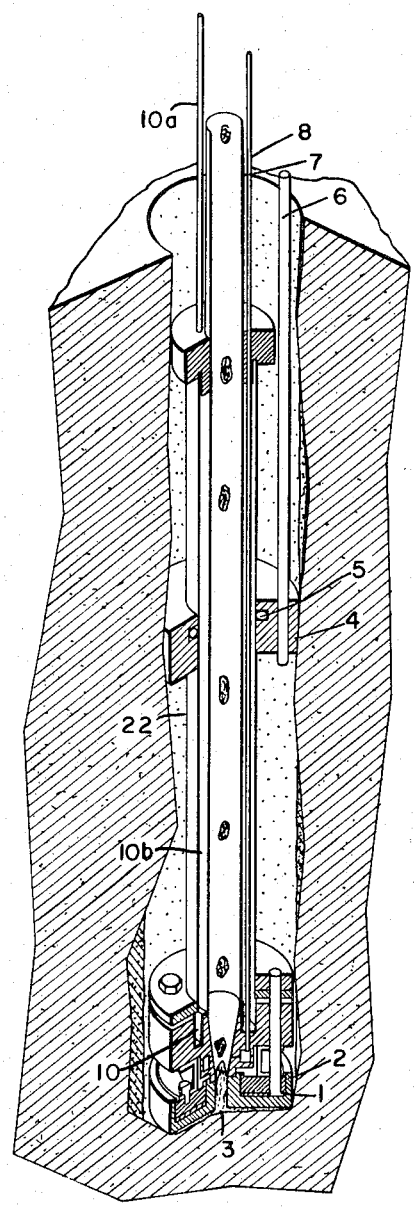
FIGURE 1 is a vertical sectional view of a thermal drill constructed in accordance with the principles of this invention.

FIGURE 1 shows a thermal drill in which rock is melted by a heater 1, which heat is transferred to the shoe 2 causing the molten rock to flow through a centrally located orifice 3 in the said shoe and being blown up guide tube 7 by a gas gun 11a causing the extruded or molten rock to be removed from the hole. Expansion seal 4 and sliding seal 5 permit movement of the drill up and down the hole. The gas gun 11a is supplied with nitrogen or other gas through gas tube 8. Power is supplied through electrical leads (not shown) contained in conduit 6 to the heater 1.

Power at approximately 15 volts and 150 amps is supplied from a small commercial welding transformer and said power is dissipated in a heater 1 fabricated from 0.038 cm. tungsten sheet. The heater 1 is suspended 0.05 cms. above the inside surface of the shoe 2. The heated shoe 2 is pressed into the rock, the molten rock being forced through its central orifice 3 and extrusion tube 7.

The extruded rock is blown out of the hole by high velocity helium, approximately 2000 cm. per second, which flows through gas tubes 8 and 8a. The upper portion of the drill is cooled by water flowing into plenum 10 through water inlet tube 10a, annular channel 10b, formed by tubular housing 22 and out a water exit tube (not shown).

Figure 2:
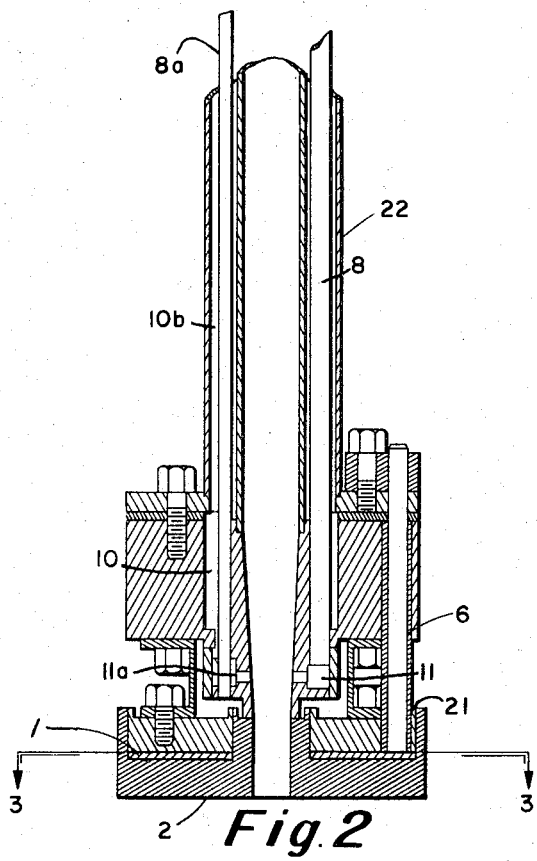
FIGURE 2 is a vertical cross-sectional view of another embodiment of this invention showing the internal components thereof.
Figure 3:
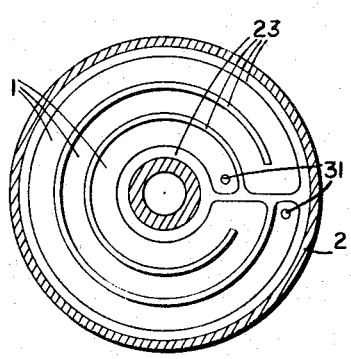
FIGURE 3 is a horizontal sectional view of the heater element taken along the line 3—3 of FIG. 2.

FIGURE 2 shows a heater 1 embedded between two 0.020-inch plates of boron nitride 23 and shown in cross section in FIGURE 3. Tubular housing 22 provides an outside jacket to guide tube 7 that serves as the central orifice and extrusion tube for the molten rock that is melted by the molybdenum shoe 2. Gas guns 11 and 11a supply helium to the guide tube 7 so as to remove the extruded melted rock from the drill face. Micarta gasket 21 insulates the electrical lead from the molybdenum shoe 2. This heater may be operated up to approximately 1850° C. at which point an irreversible change in the heater resistance occurs. The inventors have found through X-ray examination of the tungsten heater element that above this temperature various tungsten borides are formed on the tungsten heater surface due to the reaction of the boron nitride with the tungsten.

FIGURE 3 is a horizontal sectional view taken along line 3—3 and shows both the heater 1 and a boron nitride plate 23. The heater's electrical connection points 31 are supplied with power by leads (not shown).

Figure 4:
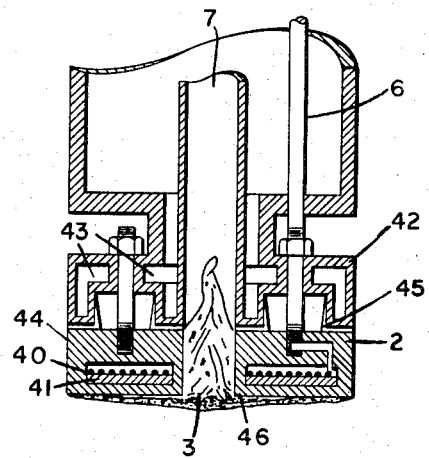
FIGURE 4 is a vertical sectional view of another modification of the drill shown in FIGURE 1.

FIGURE 4 is another embodiment with minor changes of the heater assembly shown in FIGURE 2 above. In particular, FIGURE 4 shows a central orifice 3 through which the molten rock is removed from the drill face 46. FIGURE 4 shows a similar drill except that the heater is formed of tungsten wire 40 embedded in boron nitride insulation 41 in spiral grooves. This heater arrangement allows lower currents to be used to accomplish the transfer of the same amount of heat to the shoe 2. A water cooled pusher 42 and 43 transmits drill pipe force to the shoe 2. The shoe is made of tungsten and may be clad with a thin layer 44 of rhodium or iridium. Likewise, the heater wire 40 can be made of either tungsten or iridium metal. Boron nitride 45 insulates the tungsten electrical lead 6 from the pusher 42.

A preferred embodiment of this invention is the drill described in FIGURE 2 above. This drill operates at the rate of 0.0067 cm. per second or approximately 18 feet per day. The shoe temperature is approximately 1180° C. Higher velocities or drill rates up to but not exceeding 135 feet per day may be obtained using this device by increasing the temperature of the heating element up to 1800° C. and enlarging the extrusion hole so as to remove the melted rock at a faster rate.

Table II shows the various properties of refractory metals when used as materials in a high temperature rock drill such as described in FIGURES 1 through 4.

TABLE II

| Metal | M.P., °C. | Air Corrosion,[1] cm./day | Rock Corrosion,[2] cm./day | Time,[3] days | Hardness,[4] kg./mm.[2] |
|---|---|---|---|---|---|
| Mo | 2,610 | 10 | 0.2 | 0.17 | 160 |
| W  | 3,410 | 0.7 | 0.01 | 2 | 470 |
| Ir | 2,442 | 0.01 | 0.0002 | 150 | 380 |
| Cr | 1,875 | 0.007 | 0.0001 | 200 | |
| Hf | 1,975 | 0.002 | 0.00003 | 500 | |
| Rh | 1,960 | 0.0001 | 0.000002 | 15,000 | 100 |
| Re | 3,180 | 2.4 | 0.04 | 0.05 | 310 |

[1] A plus 1,300° C.
[2] Taken as 1/60 of air corrosion rate.
[3] Time for 0.025 cm. surface corrosion.
[4] At 1,3000° C.

It is therefore apparent that the present invention provides a novel arrangement and association of parts which results in a rock melting drill having numerous advantages over prior art devices. While presently preferred embodiments of the invention have been described, it is clear that many other modifications may be made without departing from the scope of the invention. Therefore, the present invention is not limited by the foregoing description, but solely by the appended claim.

What is claimed is:

A high temperature rock drill comprising a tubular housing, a drill face consisting of a tungsten disc closing one end of said housing and having a central orifice therein, a flat coiled tungsten heater placed adjacent said disc, said heater being imbedded in a thin layer of boron nitride, power supply means electrically connected to said heater, a guide tube of smaller diameter in said housing and concentric therewith and centrally positioned within said housing, said guide tube being connected to said orifice, and pneumatic means for removing through said guide tube material melted by contact with said drill face.

References Cited

UNITED STATES PATENTS

| | | | |
|---|---|---|---|
| 1,898,926 | 2/1933 | Aarts et al. | 175—16 |
| 1,993,642 | 3/1935 | Aarts et al. | 175—16 |
| 2,202,034 | 5/1940 | Thomas | 219—278 |
| 2,953,353 | 9/1960 | Allen | 175—16 |
| 3,115,194 | 12/1963 | Adams | 175—11 |
| 3,138,697 | 6/1964 | Banca et al. | 219—553 X |

OTHER REFERENCES

Condensed Chemical Dictionary, Reinhold Pub. Co., New York, 1964, pp. 613, 614, 760, 761, 983.

"Heated Bit Melts Through Solid Rock," in The Oil and Gas Journal, 63(2), Jan. 11, 1965, p. 54.

CHARLES E. O'CONNELL, *Primary Examiner.*

I. A. CALVERT, *Assistant Examiner.*